(12) United States Patent
Kaneda

(10) Patent No.: US 9,485,337 B2
(45) Date of Patent: Nov. 1, 2016

(54) MOBILE TERMINAL DEVICE AND METHOD FOR MANUFACTURING THE SAME

(71) Applicant: NEC CASIO Mobile Communications, Ltd., Kawasaki-shi, Kanagawa (JP)

(72) Inventor: Tetsuya Kaneda, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/436,143

(22) PCT Filed: Jun. 4, 2013

(86) PCT No.: PCT/JP2013/003513
§ 371 (c)(1),
(2) Date: Apr. 16, 2015

(87) PCT Pub. No.: WO2014/068807
PCT Pub. Date: May 8, 2014

(65) Prior Publication Data
US 2015/0281412 A1    Oct. 1, 2015

(30) Foreign Application Priority Data
Oct. 29, 2012    (JP) .................................. 2012-238063

(51) Int. Cl.
*H04M 1/00* (2006.01)
*H04M 1/02* (2006.01)
*H04M 1/03* (2006.01)

(52) U.S. Cl.
CPC .............. *H04M 1/026* (2013.01); *H04M 1/03* (2013.01); *H04M 1/035* (2013.01); *H04M 1/0214* (2013.01); *H04M 2250/16* (2013.01)

(58) Field of Classification Search
CPC ..... H04M 1/0202; H04M 1/026; H04M 1/03
USPC .......................................... 455/575.1–575.8
See application file for complete search history.

(56) References Cited

U.S. PATENT DOCUMENTS

| | | |
|---|---|---|
| 2010/0066643 A1 | 3/2010 | King et al. |
| 2010/0210298 A1 | 8/2010 | Williams et al. |
| 2011/0059777 A1 | 3/2011 | Rao |

FOREIGN PATENT DOCUMENTS

| | | |
|---|---|---|
| CN | 200947621 Y | 9/2007 |
| CN | 102455739 A | 5/2012 |

(Continued)

OTHER PUBLICATIONS

International Search Report for PCT Application No. PCT/JP2013/003513, mailed on Aug. 20, 2013.

(Continued)

*Primary Examiner* — Charles Shedrick

(57) ABSTRACT

A mobile terminal device in which a speaker sound hole is arranged sufficiently apart from a receiver sound hole is provided. A mobile terminal device according to one exemplary embodiment of the present invention includes a housing; a first display means that is arranged on a side of a first principal surface in the housing ; a second display means that is arranged on a side of a second principal surface opposite to the first principal surface in the housing; a receiver sound hole that is formed on the first principal surface of the housing; a receiver that is fixed in the housing; and a speaker sound hole that is formed on a side surface of the housing opposite to the receiver sound hole with the first display means interposed therebetween; and a speaker that is fixed in the housing.

6 Claims, 8 Drawing Sheets

(56) References Cited

FOREIGN PATENT DOCUMENTS

| EP | 2048894 A1 | 4/2009 |
|---|---|---|
| JP | 2008-211736 A | 9/2008 |
| JP | 2010-068485 A | 3/2010 |
| JP | 2010-103763 A | 5/2010 |
| JP | 3167774 U | 4/2011 |
| JP | 2011-259182 A | 12/2011 |
| JP | 2012-114739 A | 6/2012 |
| WO | 2012008420 A1 | 1/2012 |

OTHER PUBLICATIONS

Extended European Search Report for EP Application No. EP13851720.6 dated on Jul. 5, 2016.
Iphone 5 user manual, http://www.cocoachina.com/apple/2012092214828.html, chenxi, CocoaChina, pp. 1-2.
Chinese Office Action for CN Application No. 201380056401.2 issued on Aug. 3, 2016 with English Translation.

MOBILE TERMINAL DEVICE AND METHOD FOR MANUFACTURING THE SAME

This application is a National Stage Entry of PCT/JP2013/003513 filed on Jun. 4, 2013, which claims priority from Japanese Patent Application 2012-238063 filed on Oct. 29, 2012, the contents of all of which are incorporated herein by reference, in their entirety.

TECHNICAL FIELD

The present invention relates to a mobile terminal device and a method for manufacturing the same.

BACKGROUND ART

Mobile telephones, tablet terminals, and Personal Digital Assistants (PDAs) have been widely used as mobile terminal devices, in which much ingenuity has been exercised in the arrangement of receivers, speakers and the like. In a mobile terminal device disclosed in each of Patent literature 1 and 2, a receiver sound hole is formed in an upper part of a principal surface of a housing and a speaker sound hole is formed on a side surface arranged in the lateral direction of the housing.

CITATION LIST

Patent Literature

Patent literature 1: Japanese Unexamined Patent Application Publication No. 2010-103763
Patent literature 2: Japanese Unexamined Patent Application Publication No. 2010-68485

SUMMARY OF INVENTION

Technical Problem

A sound output from the speaker is louder than a sound output from the receiver. It is therefore preferable to arrange the speaker sound hole apart from the receiver sound hole so that a user who brings his/her ear close to the receiver is not influenced by a sound that is output from the speaker due to an erroneous operation or the like.

However, in the mobile terminal device disclosed in each of Patent literature 1 and 2, the receiver sound hole is formed in the upper part of the principal surface of the housing and the speaker sound hole is formed on the side surface arranged in the lateral direction of the housing. It is therefore difficult to arrange the speaker sound hole sufficiently apart from the receiver sound hole.

The present invention has been made in order to solve the aforementioned problem and aims to provide a mobile terminal device in which a speaker sound hole is arranged sufficiently apart from a receiver sound hole and a method for manufacturing the mobile terminal device.

Solution to Problem

A mobile terminal device according to one exemplary embodiment of the present invention includes: a housing; a first display means that is arranged on a side of a first principal surface in the housing; a second display means that is arranged on a side of a second principal surface opposite to the first principal surface in the housing; a receiver sound hole that is formed on the first principal surface of the housing; a receiver that is fixed in the housing and overlaps the receiver sound hole in a direction perpendicular to the first principal surface of the housing; a speaker sound hole that is formed on a side surface of the housing opposite to the receiver sound hole with the first display means interposed therebetween; and a speaker that is fixed in the housing and overlap the speaker sound hole in a direction perpendicular to a side surface of the housing in which the speaker sound hole is formed.

A method for manufacturing a mobile terminal device according to one exemplary embodiment of the present invention includes the processes of: arranging a first display means on a side of a first principal surface in a housing; arranging a second display means on a side of a second principal surface opposite to the first principal surface in the housing; forming a receiver sound hole on the first principal surface of the housing; fixing a receiver in the housing so that the receiver overlaps the receiver sound hole in a direction perpendicular to the first principal surface of the housing; forming a speaker sound hole on a side surface of the housing opposite to the receiver sound hole with the first display means interposed therebetween; and fixing a speaker in the housing so that the speaker overlaps the speaker sound hole in a direction perpendicular to a side surface of the housing in which the speaker sound hole is formed.

Advantageous Effects of Invention

According to the present invention, it is possible to provide a mobile terminal device in which a speaker sound hole is arranged sufficiently apart from a receiver sound hole and a method for manufacturing the mobile terminal device.

DESCRIPTION OF EMBODIMENTS

A mobile terminal device and a method for manufacturing the mobile terminal device according to exemplary embodiments of the present invention will be described. However, the present invention is not limited to the following exemplary embodiments. For the sake of clarification of the description, the following description and the drawings are simplified as appropriate.

<First Exemplary Embodiment>

Figure 1:
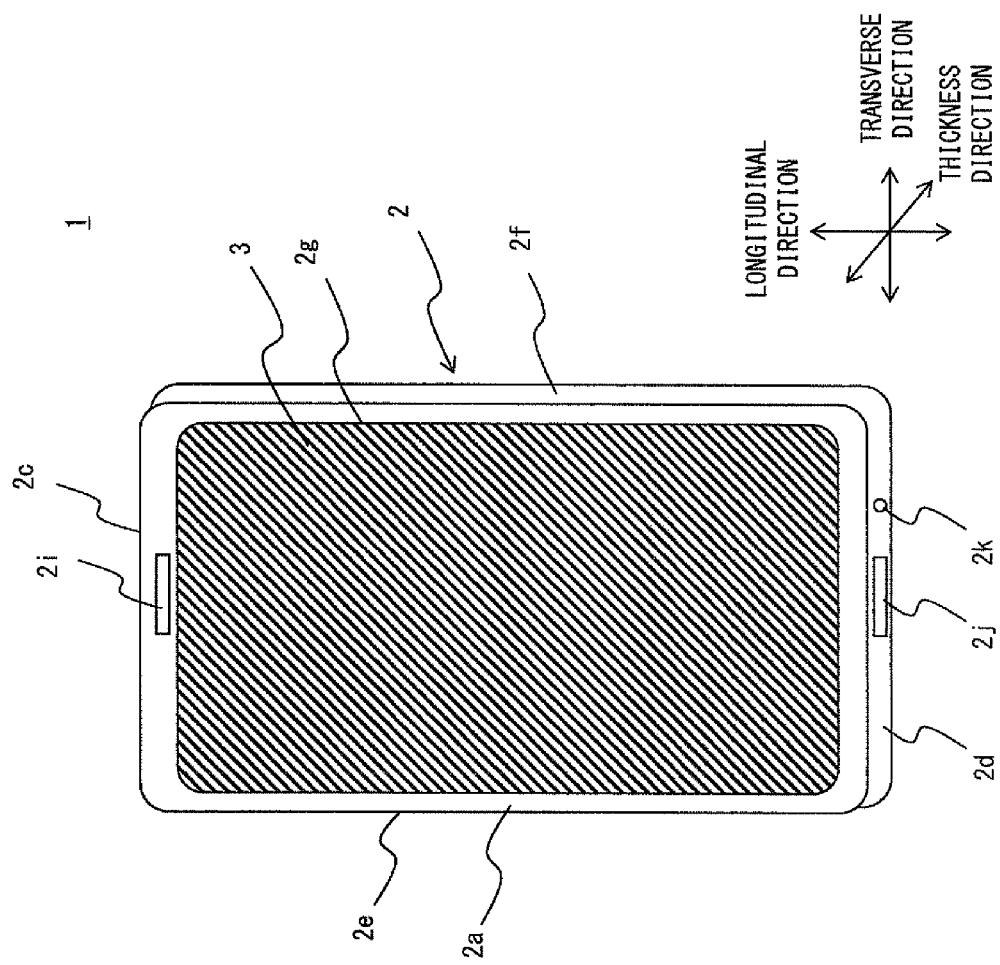
FIG. 1 is a top-side perspective view schematically showing a mobile terminal device according to a first exemplary embodiment.
Figure 2:
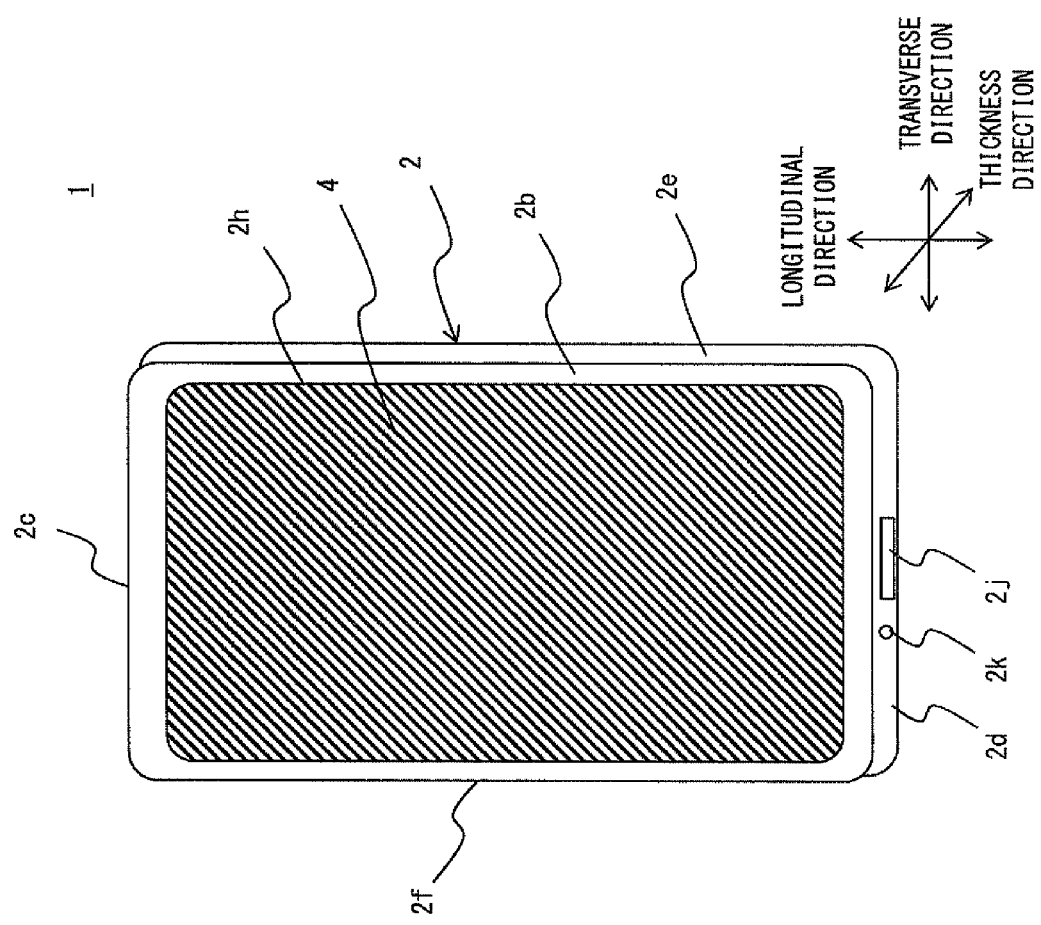
FIG. 2 is a bottom-side perspective view schematically showing the mobile terminal device according to the first exemplary embodiment.
Figure 3:
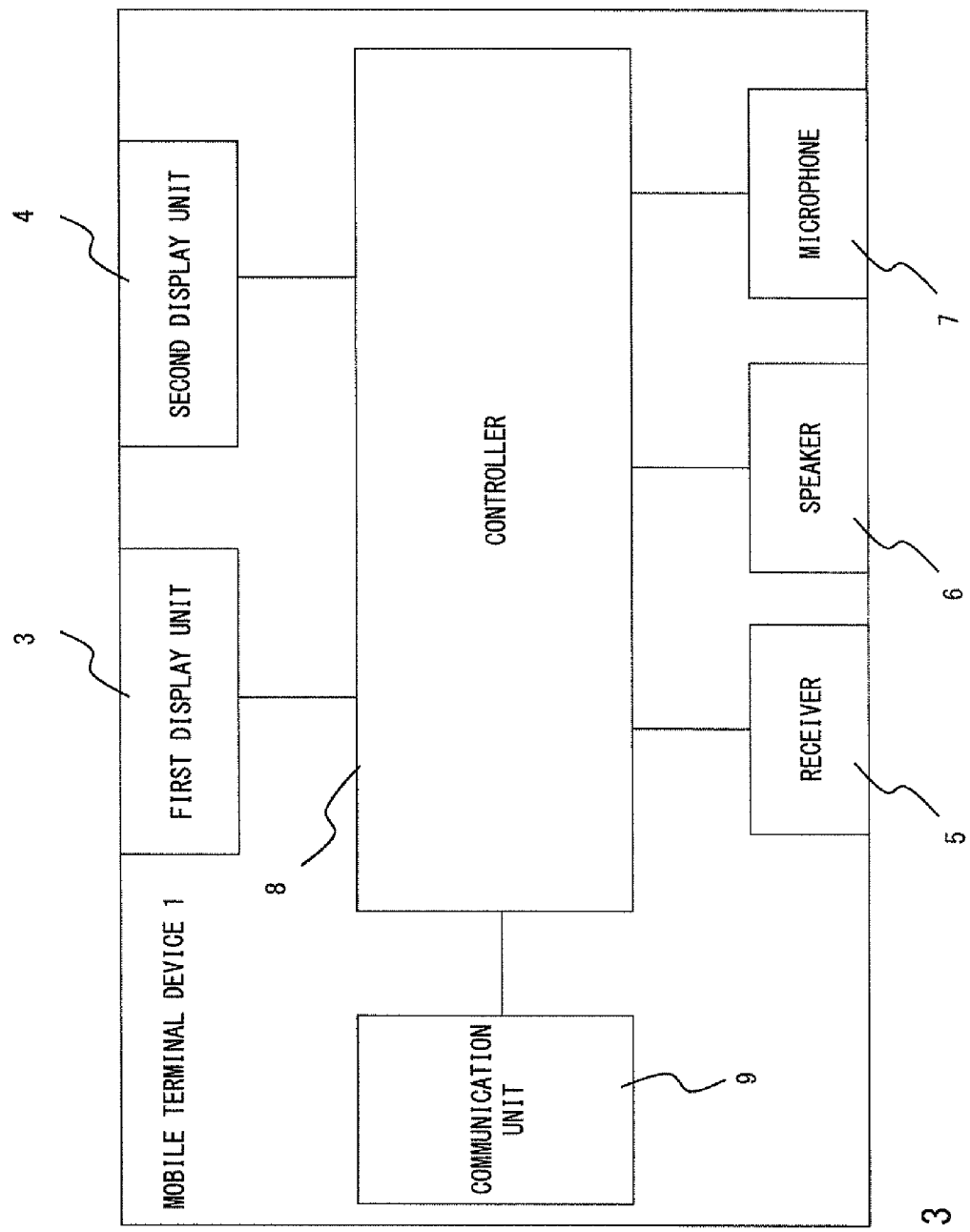
FIG. 3 is a block diagram of a control system of the mobile terminal device according to the first exemplary embodiment.

FIG. 1 is a top-side perspective view schematically showing a mobile terminal device according to this exemplary embodiment. FIG. 2 is a bottom-side perspective view schematically showing the mobile terminal device according to this exemplary embodiment. FIG. 3 is a block diagram of a control system of the mobile terminal device according to the first exemplary embodiment. While a mobile terminal device 1 according to this exemplary embodiment is formed as a mobile telephone, a tablet terminal, a PDA or the like may be used instead of the mobile telephone substantially in a similar way.

As shown in FIGS. 1 to 3, the mobile terminal device 1 includes a housing 2, a first display unit 3, a second display unit 4, a receiver 5, a speaker 6, a microphone 7, a controller 8, and a communication unit 9.

The housing 2 includes the first display unit 3, the second display unit 4, the receiver 5, the speaker 6, the microphone 7, the controller 8, and the communication unit 9. The housing 2 includes surfaces facing each other in the thickness direction, each of the surfaces including an opening. The housing 2 according to this exemplary embodiment is formed to have a substantially rectangular shape when seen from the thickness direction. The housing 2 includes principal surfaces 2a and 2b facing each other in the thickness direction, side surfaces 2c and 2d facing each other in the longitudinal direction, and side surfaces 2e and 2f facing each other in the transverse direction. An opening 2g is formed on a principal surface (first principal surface) 2a of the housing 2. Further, an opening 2h is formed on a principal surface (second principal surface) 2b of the housing 2.

A receiver sound hole 2i is formed in the housing 2. The receiver sound hole 2i according to this exemplary embodiment is formed in one side of both sides of the first principal surface 2a facing each other in the longitudinal direction with the opening 2g interposed therebetween. Specifically, the receiver sound hole 2i is formed to penetrate through the first principal surface 2a. Therefore, the receiver sound hole 2i is formed on the same plane as that where the first principal surface 2a is formed. The receiver sound hole 2i is arranged substantially at the center of the transverse direction of the housing 2. Further, the receiver sound hole 2i is formed into a long hole and is arranged in such a way that the longitudinal direction of the receiver sound hole 2i is aligned with the transverse direction of the housing 2. However, the shape of the receiver sound hole 2i is not particularly limited.

Further, a speaker sound hole 2j is formed in the housing 2. The speaker sound hole 2j according to this exemplary embodiment is formed on the side surface 2d arranged opposite to the side of the housing 2 in which the receiver sound hole 2i is arranged with the opening 2g interposed therebetween. More specifically, the speaker sound hole 2j is formed to penetrate through the side surface 2d. Accordingly, the speaker sound hole 2j is formed on the same plane as the plane where the side surface 2d is formed. The speaker sound hole 2j is arranged substantially at the center of the transverse direction of the housing 2 in the side surface 2d. Further, the speaker sound hole 2j is formed into a long hole and is arranged in such a way that the longitudinal direction of the speaker sound hole 2j is aligned with the transverse direction of the housing 2. However, the shape of the speaker sound hole 2j is not particularly limited.

Further, a microphone sound hole 2k is formed in the housing 2. The microphone sound hole 2k according to this exemplary embodiment is arranged near the speaker sound hole 2j on the side surface 2d and is formed to penetrate through the side surface 2d. However, the arrangement of the microphone sound hole 2k is not particularly limited and it is sufficient if the microphone sound hole 2k is arranged near the user's mouth when the user brings his/her ear close to the receiver sound hole 2i.

The first display unit 3 serves as an image display unit or an operation unit of the mobile terminal device 1. The first display unit 3 is arranged on the side of the first principal surface 2a of the housing 2. The first display unit 3 according to this exemplary embodiment includes a backlight, a liquid crystal panel, a touch panel that covers the liquid crystal panel and the like. The first display unit 3 is fixed to the housing 2 so that the first display unit 3 is exposed from the opening 2g of the housing 2.

The second display unit 4 also serves as an image display unit or an operation unit of the mobile terminal device 1. The second display unit 4 is arranged on the side of the second principal surface 2b of the housing 2. The second display unit 4 is preferably formed in such a manner that the second display unit 4 has substantially the same shape and substantially the same size as those of the first display unit 3. The second display unit 4 according to this exemplary embodiment also includes a backlight, a liquid crystal panel, a touch panel that covers the liquid crystal panel and the like. The second display unit 4 is fixed to the housing 2 so that the second display unit 4 is exposed from the opening 2h of the housing 2.

The receiver 5 outputs a received voice or the like. The receiver 5 according to this exemplary embodiment is arranged in such a way that the receiver 5 overlap the receiver sound hole 2i in the thickness direction of the housing 2 and is fixed to the housing 2. As a result, the sound output from the receiver 5 is emitted to the outside of the housing 2 from the receiver sound hole 2i.

The speaker 6 outputs music data or the like stored in a storage unit (not shown). The speaker 6 according to this exemplary embodiment is arranged in such a way that the speaker 6 overlap the speaker sound hole 2j in the longitudinal direction of the housing 2 and is fixed to the housing 2. As a result, the sound output from the speaker 6 is emitted to the outside of the housing 2 from the speaker sound hole 2j.

The microphone 7 converts a user's voice or the like into signals. The microphone 7 according to this exemplary embodiment is arranged in such a way that the microphone 7 overlap the microphone sound hole 2k in the longitudinal direction of the housing 2 and is fixed to the housing 2. As a result, the user's voice or the like is input to the microphone 7 through the microphone sound hole 2k.

The controller 8 achieves a function as the mobile terminal device 1 based on a program stored in a storage unit (not shown). For example, the controller 8 controls the first display unit 3 or the second display unit 4, outputs signals supplied from the communication unit 9 to the receiver 5, or outputs signals supplied from the microphone 7 to the communication unit 9 based on the program stored in the storage unit and input signals from the first display unit 3 or the second display unit 4. Further, the controller 8 outputs music data or the like stored in the storage unit to the speaker 6 based on the program stored in the storage unit and the input signals from the first display unit 3 or the second display unit 4. Further, the controller 8 controls the communication unit 9 based on the program stored in the storage unit and the input signals from the first display unit 3 or the second display unit 4.

The communication unit 9 demodulates signals transmitted from, for example, a public network to output the demodulated signals to the controller 8 or modulates signals supplied from the controller 8 to output the modulated signals to the public network.

When a user makes a phone call using such a mobile terminal device 1, the user brings his/her ear close to the receiver sound hole 2i and brings his/her mouth close to the microphone sound hole 2k. That is, when the user makes a phone call using the mobile terminal device 1, the mobile terminal device 1 is used in a state in which the longitudinal direction of the housing 2 is aligned with a substantially vertical direction.

At this time, in the mobile terminal device 1 according to this exemplary embodiment, the receiver sound hole 2i is formed in one side of both sides of the first principal surface 2a facing each other in the longitudinal direction with the opening 2g interposed therebetween. Further, the speaker sound hole 2j is formed on the side surface 2d arranged opposite to the side of the housing 2 where the receiver sound hole 2i is arranged with the opening 2g interposed therebetween. In summary, the receiver sound hole 2i and the speaker sound hole 2j are arranged with the opening 2g and the first display unit 3 interposed therebetween. Accordingly, the speaker sound hole 2j can be arranged sufficiently apart from the receiver sound hole 2i. In particular, since the distance between the speaker sound hole 2j and the receiver sound hole 2i corresponds to the length of the longitudinal direction of the housing 2, the distance between them can be sufficiently large. Accordingly, even when a sound is output from the speaker 6 due to an erroneous operation or the like, this sound has little influence on the user since the speaker sound hole 2j is apart from the user's ear.

In addition, since the speaker sound hole 2j is formed on the side surface 2d of the housing 2, even when the first principal surface 2a or the second principal surface 2b of the housing 2 comes into contact with the upper surface of a desk or the like when the mobile terminal device 1 is placed on the desk or the like, the speaker sound hole 2j is not obstructed and the sound can be output properly.

Further, since the receiver sound hole 2i and the like are not formed on the side of the second principal surface 2b, it is possible to visually distinguish the first principal surface 2a from the second principal surface 2b of the mobile terminal device 1 easily. Even when such a configuration is employed in which the first display unit 3 and the second display unit 4 are arranged substantially at the same position when the mobile terminal device 1 is rotated about a side of the housing 2, it is possible to distinguish the first principal surface 2a from the second principal surface 2b of the mobile terminal device 1 by checking the surface where the receiver sound hole 2i is formed. In other words, even when such a configuration is employed in which the first display unit 3 and the second display unit 4 are arranged at the same position in the longitudinal direction and the transverse direction in the housing 1 when the mobile terminal device 1 is rotated around a side of the housing 2, it is possible to easily distinguish the first principal surface 2a from the second principal surface 2b of the mobile terminal device 1.

<Second Exemplary Embodiment>

A mobile terminal device according to this exemplary embodiment has the same configurations as those of the mobile terminal device according to the first exemplary embodiment except for the arrangement of the speaker. Accordingly, mainly this difference between the above configurations will be described while the overlapping descriptions will be omitted. Elements of these embodiments which are the same are denoted by the same reference symbols.

Figure 4:
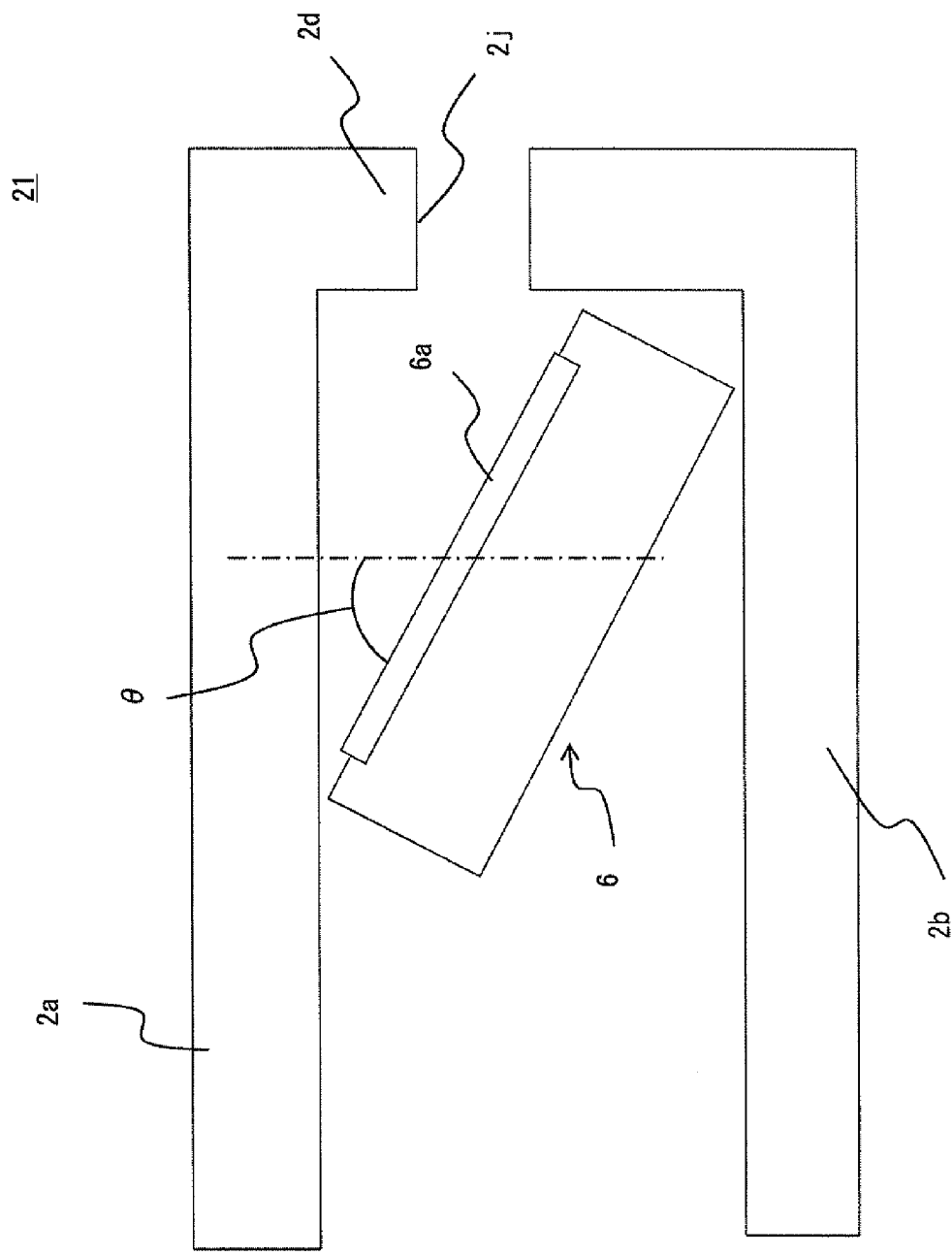
FIG. 4 is a cross-sectional view showing an area around a speaker of a mobile terminal device according to a second exemplary embodiment.

FIG. 4 is a cross-sectional view showing an area around the speaker of the mobile terminal device according to this exemplary embodiment. As shown in FIG. 4, a speaker 6 of a mobile terminal device 21 is inclined with respect to the side surface 2d of the housing 2. Specifically, a vibrating surface 6a of the speaker 6 is inclined to the side of the first display unit 3 at an angle θ with respect to the side surface 2d of the housing 2 in the state in which the vibrating surface 6a is arranged on the side of the speaker sound hole 2j. According to such a configuration, even when the size of the speaker 6 is enlarged, the thickness of the housing 2 can be restrained, which contributes to the improvement of the acoustic characteristics of the mobile terminal device 21 and a reduction in the thickness of the mobile terminal device.

<Third Exemplary Embodiment>

A mobile terminal device according to this exemplary embodiment has the same configurations as those of the mobile terminal device according to the first exemplary embodiment except that housings can be opened and closed. Accordingly, mainly this difference between the above configurations will be described while the overlapping descriptions will be omitted. Elements of these embodiments which are the same are denoted by the same reference symbols.

Figure 5:
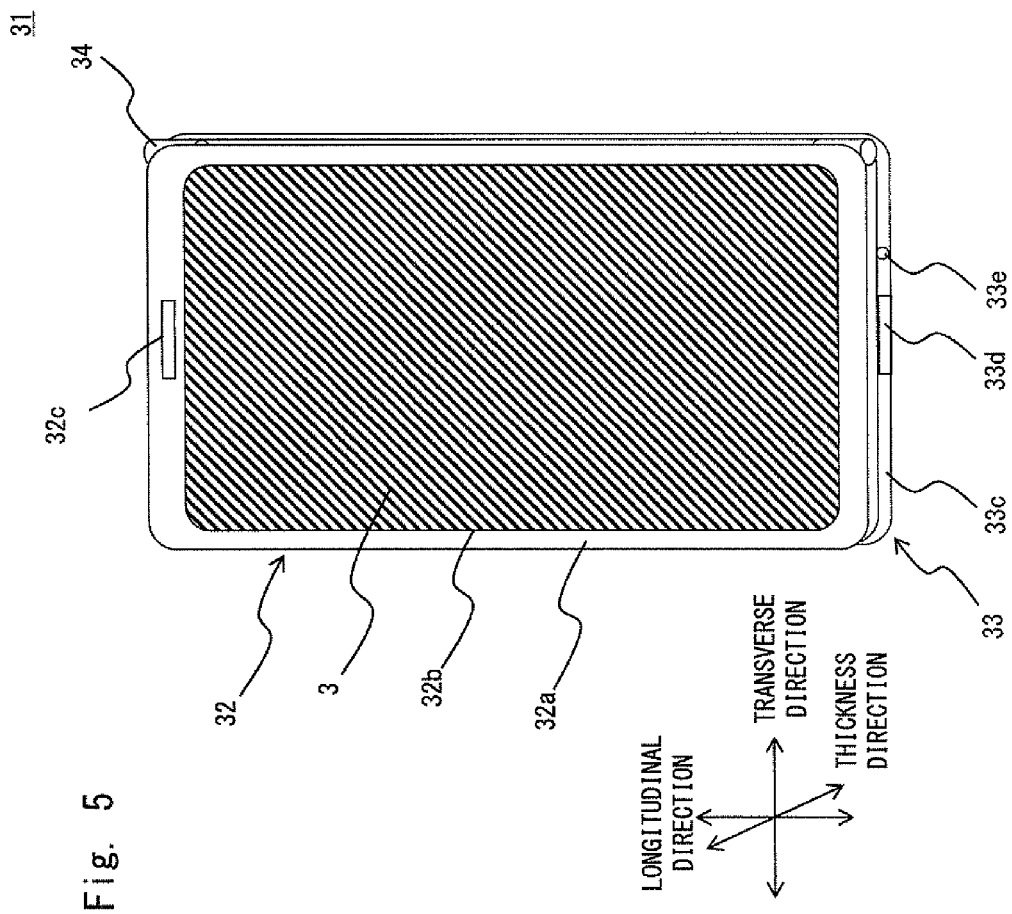
FIG. 5 is a top-side perspective view showing a state in which housings of a mobile terminal device according to a third exemplary embodiment are closed.
Figure 6:
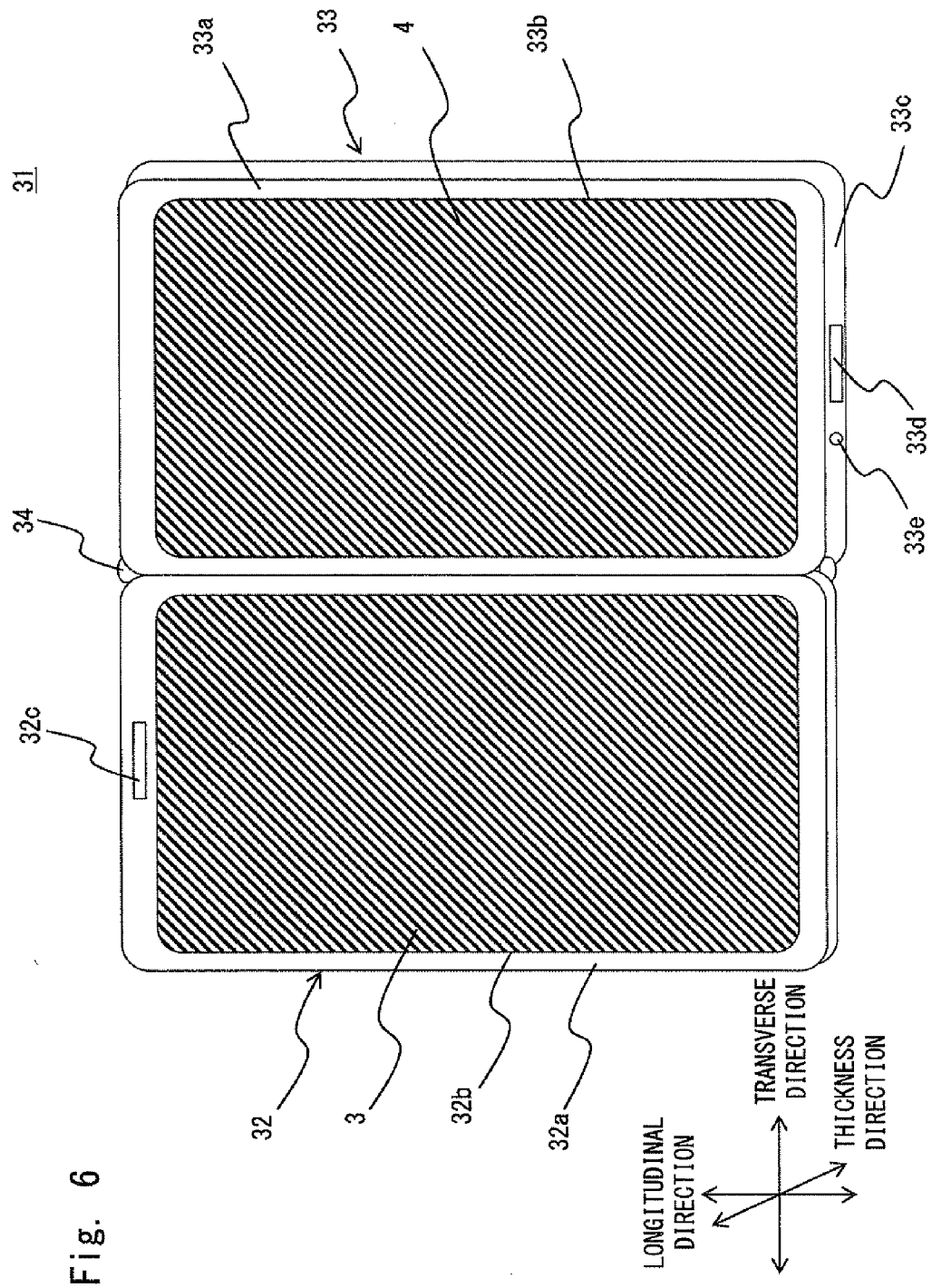
FIG. 6 is a bottom-side perspective view showing a state in which the housings of the mobile terminal device according to the third exemplary embodiment are opened.

FIG. 5 is a top-side perspective view showing a state in which housings of the mobile terminal device according to this exemplary embodiment are closed. FIG. 6 is a bottom-side perspective view showing a state in which the housings of the mobile terminal device according to this exemplary embodiment are opened. As shown in FIGS. 5 and 6, a mobile terminal device 31 includes a first housing 32, a second housing 33, and a hinge 34. That is, the first housing 32 and the second housing 33 are coupled via the hinge 34 so that the first housing 32 and the second housing 33 can be opened or closed.

The first housing 32 is formed to have a substantially rectangular shape when seen from the thickness direction. More specifically, the first housing 32 includes principal surfaces facing each other in the thickness direction, side surfaces facing each other in the longitudinal direction, and side surfaces facing each other in the transverse direction.

An opening 32b is formed on the principal surface 32a which is in the side opposite to the principal surface in the first housing 32 facing the second housing 33 in the state in which the first housing 32 and the second housing 33 are closed. The first display unit 3 is exposed from this opening 32b.

Further, a receiver sound hole 32c is formed in one side of both sides of the principal surface 32a of the first housing 32 facing each other in the longitudinal direction with the first display unit 3 interposed therebetween. The receiver 5 is arranged so that the receiver 5 overlaps the receiver sound hole 32c in the thickness direction of the first housing 32 and is fixed to the first housing 32.

The second housing 33 is also formed to have a substantially rectangular shape when seen from the thickness direction and formed, for example, to have substantially the same shape and substantially the same size as those of the first housing 32. Specifically, the second housing 33 includes principal surfaces facing each other in the thickness direction, side surfaces facing each other in the longitudinal direction, and side surfaces facing each other in the transverse direction.

An opening 33b is formed on the principal surface 33a opposite to the principal surface in the second housing 33 facing the first housing 32 in the state in which the first housing 32 and the second housing 33 are closed. The second display unit 4 is exposed from this opening 33b. In summary, in the mobile terminal device 31, the first display unit 3 and the second display unit 4 are exposed in the state in which the first housing 32 and the second housing 33 are closed.

Further, a speaker sound hole 33d is formed on one of both sides of the second housing 33 facing with each other in the longitudinal direction. More specifically, the speaker sound hole 33d is formed on a side surface 33c arranged opposite to the side of the first housing 32 where the receiver sound hole 32c is arranged with the second display unit 4 interposed therebetween when seen from the thickness direction in the state in which the first housing 32 and the second housing 33 are closed. The speaker 6 is arranged so that the speaker 6 overlaps the speaker sound hole 33d in the longitudinal direction of the second housing 33 and is fixed to the second housing 33.

Further, a microphone sound hole 33e is formed near the speaker sound hole 33d on the side surface 33c of the second housing 33. The microphone 7 is arranged so that the microphone 7 overlaps the microphone sound hole 33e in the longitudinal direction of the second housing 33 and is fixed to the second housing 33.

In such a mobile terminal device 31, the speaker sound hole 33d is formed on one of both sides of the second housing 33 facing with each other in the longitudinal direction. More specifically, the speaker sound hole 33d is formed on the side surface 33c arranged opposite to the side of the first housing 32 where the receiver sound hole 32c is arranged with the second display unit 4 interposed therebetween when seen from the thickness direction in the state in which the first housing 32 and the second housing 33 are closed. Accordingly, the speaker sound hole 33d is arranged sufficiently apart from the receiver sound hole 32c in the longitudinal direction of the housing. According to such a configuration, even when a sound is output from the speaker 6 due to an erroneous operation or the like, the sound has little influence on the user since the speaker sound hole 33d is distant from the user's ear.

Note that the controller 8 and the communication unit 9 may be installed in one of the first housing 32 and the second housing 33. Further, the microphone 7 may be installed in the first housing 32 instead of being installed in the second housing 33 and may have a configuration in which a sound is input to the microphone through a microphone sound hole formed in the first housing 32. Further, the speaker 6 may be installed in the first housing 32 instead of being installed in the second housing 33 and may have a configuration in which a sound is emitted through a speaker sound hole formed in the first housing 32. Further, a display unit may be arranged on the plane in the first housing 32 facing the second housing 33 or on the plane in the second housing 33 facing the first housing 32 when the first housing 32 and the second housing 33 are closed.

<Fourth Exemplary Embodiment>

A mobile terminal device according to this exemplary embodiment has configurations the same as those of the mobile terminal device according to the third exemplary embodiment except for the configuration of the hinge. Accordingly, mainly this difference between the above configurations will be described while the overlapping descriptions will be omitted. Elements of these embodiments which are the same are denoted by the same reference symbols.

Figure 7:
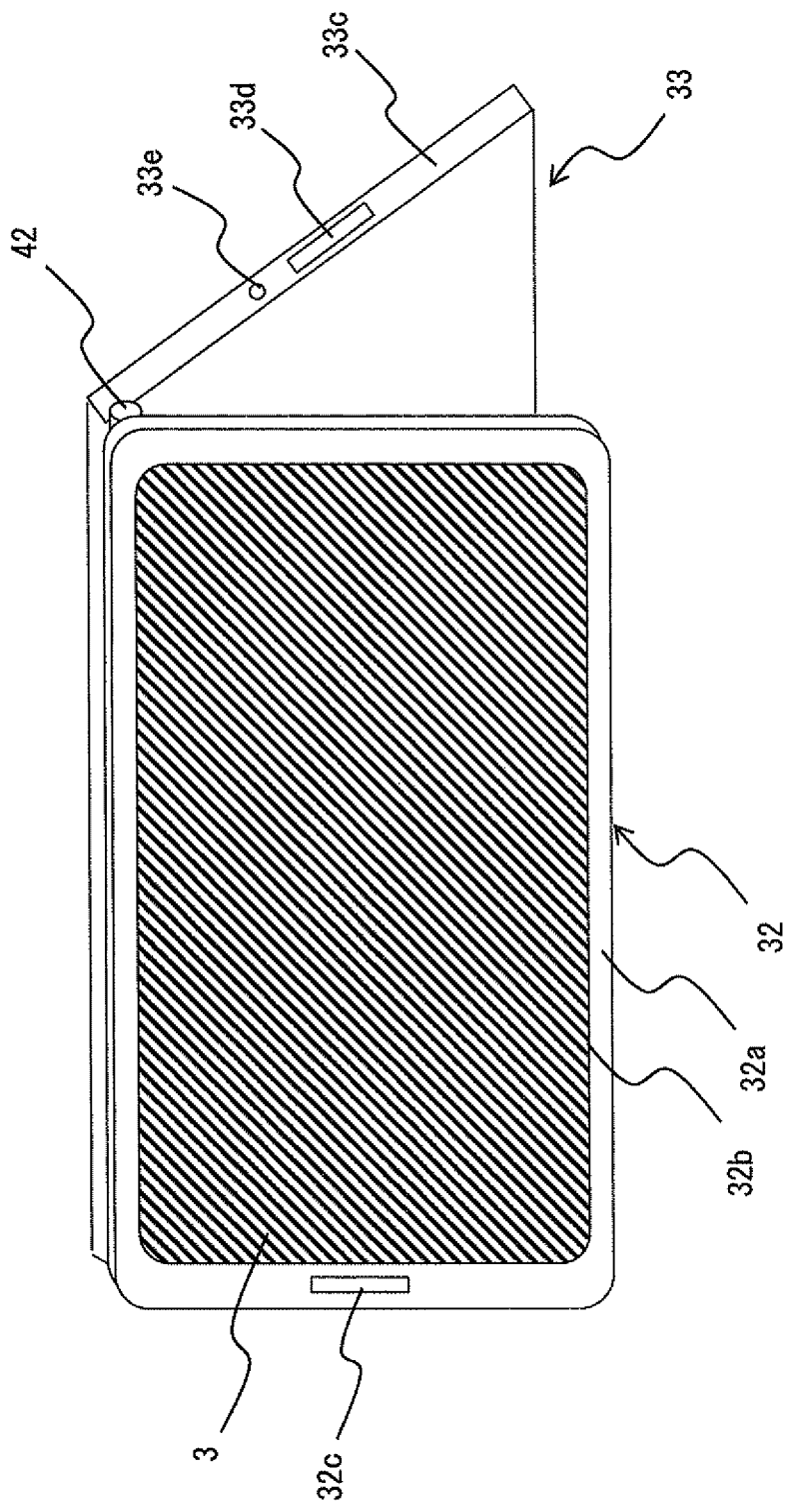
FIG. 7 is a perspective view schematically showing a state in which a first housing and a second housing of a mobile terminal device according to a fourth exemplary embodiment are opened.
Figure 8:
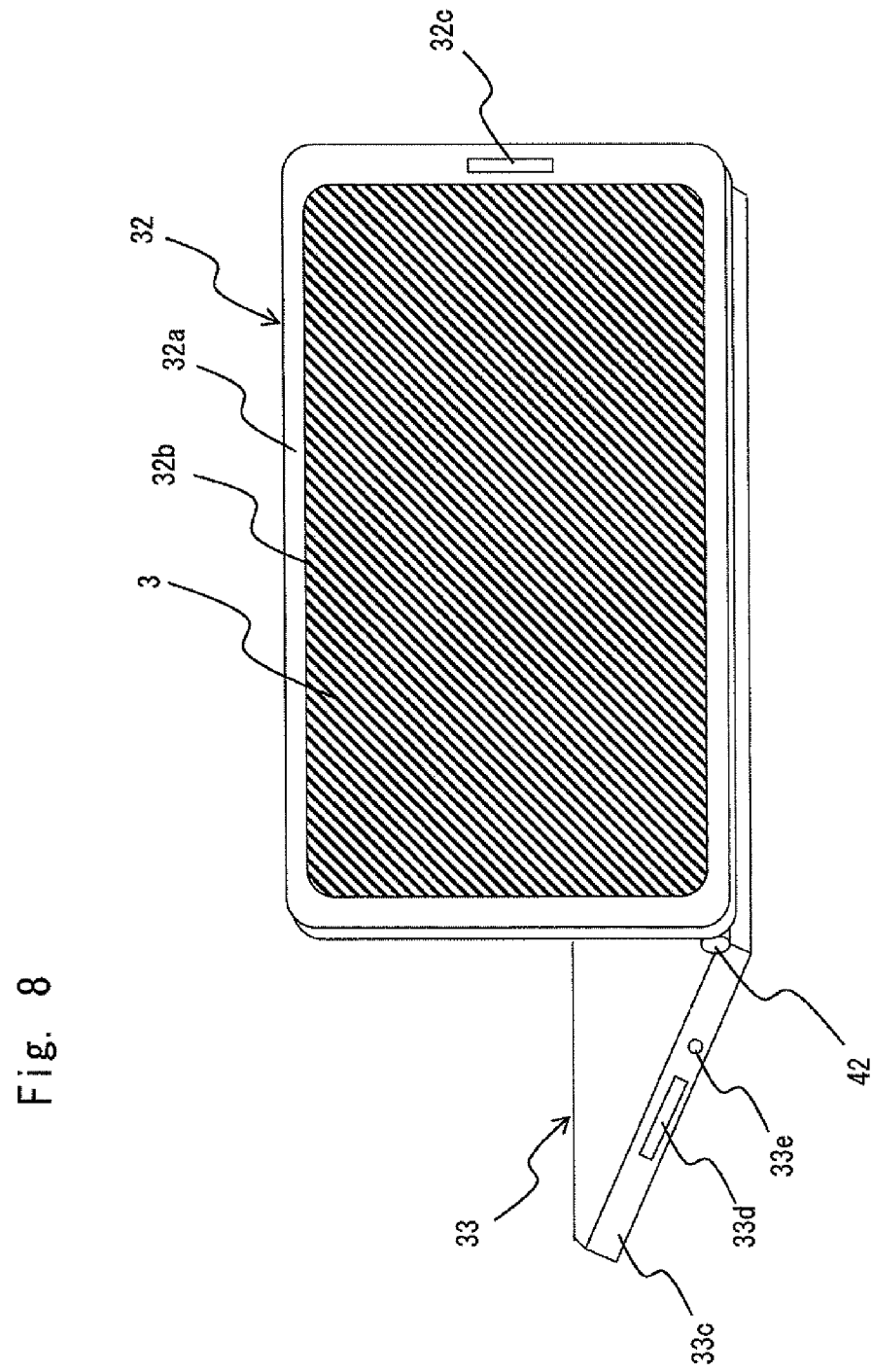
FIG. 8 is another perspective view schematically showing a state in which the first housing and the second housing of the mobile terminal device according to the fourth exemplary embodiment are opened.

FIG. 7 is a perspective view schematically showing a state in which a first housing and a second housing of the mobile terminal device according to this exemplary embodiment are opened. FIG. 8 is another perspective view schematically showing a state in which the first housing and the second housing of the mobile terminal device according to this exemplary embodiment are opened.

As shown in FIGS. 7 and 8, a hinge 42 of a mobile terminal device 41 according to this exemplary embodiment is configured to be able to keep the state in which the first housing 32 and the second housing 33 are opened or closed. The hinge 42 includes, for example, a stopper function. According to this configuration, as shown in FIGS. 7 and 8, it is possible to fix the angle of the first housing 32 and the second housing 33 to an angle at which a user can easily see the first display unit 3 or the second display unit 4 to place the mobile terminal device 41 on a desk or the like.

The present invention is not limited to the above exemplary embodiments and may be changed as appropriate without departing from the spirit of the present invention.

This application is based upon and claims the benefit of priority from Japanese Patent Application No. 2012-238063, filed on Oct. 29, 2012, the disclosure of which is incorporated herein in its entirety by reference.

INDUSTRIAL APPLICABILITY

The present invention is applicable to mobile terminal devices such as mobile telephones, tablet terminals, and Personal Digital Assistants (PDAs), and a method for manufacturing the mobile terminal device.

REFERENCE SIGNS LIST

1 MOBILE TERMINAL DEVICE
2 HOUSING
2a FIRST PRINCIPAL SURFACE
2b SECOND PRINCIPAL SURFACE
2c, 2d, 2e, 2f SIDE SURFACES
2g, 2h OPENINGS
2i RECEIVER SOUND HOLE
2j SPEAKER SOUND HOLE
2k MICROPHONE SOUND HOLE
3 FIRST DISPLAY UNIT
4 SECOND DISPLAY UNIT
5 RECEIVER
6 SPEAKER
6a VIBRATING SURFACE
7 MICROPHONE
8 CONTROLLER
9 COMMUNICATION UNIT
21 MOBILE TERMINAL DEVICE
31 MOBILE TERMINAL DEVICE
32 FIRST HOUSING
32a PRINCIPAL SURFACE
32b OPENING
32c RECEIVER SOUND HOLE
33 SECOND HOUSING
33a PRINCIPAL SURFACE
33b OPENING
33c SIDE SURFACE
33d SPEAKER SOUND HOLE
33e MICROPHONE SOUND HOLE
34 HINGE
41 MOBILE TERMINAL DEVICE
42 HINGE

What is claimed is:

1. A mobile terminal device comprising:
a housing;
a first display unit that is arranged on a side of a first principal surface in the housing;
a second display unit that is arranged on a side of a second principal surface opposite to the first principal surface in the housing;
a first sound hole that is formed on the first principal surface of the housing;
a first speaker that is fixed in the housing and overlaps the first sound hole in a direction perpendicular to the first principal surface of the housing, the first speaker being configured to emit a received voice or the like to the outside of the housing through the first sound hole;
a second sound hole that is formed on a side surface of the housing opposite to the first sound hole with the first display unit interposed therebetween; and
a second speaker that is fixed in the housing and overlaps the second sound hole in a direction perpendicular to the side surface of the housing in which the second sound hole is formed, the second speaker being configured to emit a sound represented by music data or the like to the outside of the housing through the second sound hole.

2. The mobile terminal device according to claim 1, wherein the second speaker is arranged to be inclined to the side surface of the housing in which the second sound hole is formed.

3. The mobile terminal device according to claim 1, wherein:
the housing comprises a first housing, a second housing, and a hinge that couples the first housing and the second housing so that the first housing and the second housing can be opened or closed,
the first principal surface in the housing is a surface opposite to a surface in the first housing facing the second housing in a state in which the first housing and the second housing are closed, and
the second principal surface in the housing is a surface opposite to a surface in the second housing facing the first housing in the state in which the first housing and the second housing are closed.

4. The mobile terminal device according to claim 3, wherein the hinge allows the mobile terminal device to keep a state in which the first housing and the second housing are opened or closed.

5. The mobile terminal device according to claim 3, wherein:
the first sound hole is formed in the first housing, and
the second sound hole is formed in the second housing.

6. A method for manufacturing a mobile terminal device, the method comprising the processes of:
arranging a first display unit on a side of a first principal surface in a housing;
arranging a second display unit on a side of a second principal surface opposite to the first principal surface in the housing;
forming a first sound hole on the first principal surface of the housing;
fixing a first speaker in the housing so that the first speaker overlaps the first sound hole in a direction perpendicular to the first principal surface of the housing and a received voice or the like output from the first speaker is emitted to the outside of the housing through the first sound hole;
forming a second sound hole on a side surface of the housing opposite to the first sound hole with the first display unit interposed therebetween; and
fixing a second speaker in the housing so that the second speaker overlaps the second sound hole in a direction perpendicular to the side surface of the housing in which the second sound hole is formed and a sound represented by music data or the like output from the second speaker is emitted to the outside of the housing through the second sound hole.

* * * * *